(12) United States Patent
Yin et al.

(10) Patent No.: US 10,370,569 B2
(45) Date of Patent: Aug. 6, 2019

(54) COMPOSITION FOR BONDING WINDINGS OR CORE LAMINATES IN AN ELECTRICAL MACHINE, AND ASSOCIATED METHOD

(71) Applicant: GENERAL ELECTRIC COMPANY, Schenectady, NY (US)

(72) Inventors: Weijun Yin, Niskayuna, NY (US); Gary William Yeager, Rexford, NY (US); Kevin Warner Flanagan, Troy, NY (US); David Andrew Simon, Johnstown, NY (US); Eugene Pauling Boden, Scotia, NY (US); Kathryn Amanda Misner, Duanesburg, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 15/864,073

(22) Filed: Jan. 8, 2018

(65) Prior Publication Data

US 2018/0127626 A1 May 10, 2018

Related U.S. Application Data

(62) Division of application No. 14/297,674, filed on Jun. 6, 2014, now Pat. No. 9,879,163.

(51) Int. Cl.
*C08G 67/02* (2006.01)
*H01F 41/06* (2016.01)
(Continued)

(52) U.S. Cl.
CPC .......... *C09J 165/00* (2013.01); *B05D 3/0254* (2013.01); *B05D 3/0493* (2013.01); *C08G 61/12* (2013.01);
(Continued)

(58) Field of Classification Search
CPC ........... C08G 61/12; C09J 165/00; C09K 5/14
(Continued)

(56) References Cited

U.S. PATENT DOCUMENTS 5,162,574 A * 11/1992 Craig, Jr. .............. C07C 261/02
560/301
5,415,892 A * 5/1995 Nishizawa ............... B05D 1/18
427/116

FOREIGN PATENT DOCUMENTS

CN   101402729 A   4/2009
CN   102702741 A   10/2012
(Continued)

OTHER PUBLICATIONS

Goertzen, et al., "Thermal and mechanical evaluation of cyanate ester composites with low-temperature processability", Composites Part A, 38, 2007, 779-784. Accepted Sep. 13, 2006. (Year: 2007).*
(Continued)

*Primary Examiner* — Jane L Stanley
(74) *Attorney, Agent, or Firm* — Christopher R. Carroll; The Small Patent Law Group LLC (57) ABSTRACT

A curable composition for bonding windings or core laminates in an electrical machine is presented. The curable composition includes: (A) about 10 weight percent to about 25 weight percent of a polyfunctional cyanate ester; (B) about 35 weight percent to about 65 weight percent of a first difunctional cyanate ester, or a prepolymer thereof; (C) about 15 weight percent to about 40 weight percent of a second difunctional cyanate ester, or a prepolymer thereof. An associated method is also presented.

10 Claims, 1 Drawing Sheet

(51) Int. Cl.
    *C09J 165/00*     (2006.01)
    *B05D 3/02*     (2006.01)
    *B05D 3/04*     (2006.01)
    *C08G 61/12*     (2006.01)
    *C08G 73/06*     (2006.01)
    *C08L 79/04*     (2006.01)
    *C09K 5/14*     (2006.01)

(52) U.S. Cl.
CPC .......... *C08G 73/0655* (2013.01); *C08L 79/04* (2013.01); *C08G 2261/12* (2013.01); *C08G 2261/312* (2013.01); *C09K 5/14* (2013.01)

(58) Field of Classification Search
USPC ........................................................ 524/612
See application file for complete search history.

(56) References Cited

FOREIGN PATENT DOCUMENTS

| CN | 103819898 A | 5/2014 |
| --- | --- | --- |
| CN | 104194333 A | 12/2014 |

OTHER PUBLICATIONS

Goertzen, W.K., et al. Thermal and mechanical evaluation of cyanate ester composites with low-temperature processability, Composites Part A: Applied Science and Manufacturing, vol. 38, Issue 3, pp. 779-784 (Mar. 2007).

Machine Translation and First Office Action and Search issued in connection with corresponding CN Application No. 201580030126.6 dated Nov. 26, 2018 (Office action translation is not available).

\* cited by examiner

COMPOSITION FOR BONDING WINDINGS OR CORE LAMINATES IN AN ELECTRICAL MACHINE, AND ASSOCIATED METHOD

BACKGROUND

The invention generally relates to curable compositions including cyanate ester resins. More particularly, the invention relates to cyanate ester resin compositions for bonding of an article, such as, the windings or core laminates of an electrical machine.

The stator windings of electrical inductive devices, such as motors, are typically wound with magnet wire having an enamel, or other insulative coating thereon. However, it may be desirable to further coat the windings and seal them from the environment, using varnish compositions, for example. Conventional varnish compositions typically have a glass transition temperature ($T_g$) below 80° C. and poor thermal stability. As a result, their performance at operating temperature, is unsatisfactory and may result in significant thermal degradation even after short operating times. In addition, these varnish compositions are brittle, and subject to cracking, particularly when subjected to vibrations.

Thus, improved varnish compositions for bonding windings or core laminates in an electrical machine are desired. Further, improved methods for bonding windings or core laminates in an electrical machine are also desired.

BRIEF DESCRIPTION OF THE INVENTION

Embodiments of the present invention are included to meet these and other needs. One embodiment is a curable composition for bonding windings or core laminates in an electrical machine. The curable composition includes:

(A) about 10 weight percent to about 25 weight percent of a polyfunctional cyanate ester having a structure (I)

$$NCO—Ar^1—R^1—[-Y—R^1-]_n—Ar^1—OCN, \quad (I)$$

wherein "n" is an integer equal to or greater than 1, Y has a structure (i) or (ii)

$$*R^2—Ar^2—OCN, \text{ or} \quad (i)$$

$$*Ar^2—OCN, \quad (ii)$$

$Ar^1$ and $Ar^2$ are independently at each occurrence a $C_5$-$C_{30}$ aromatic radical, $R^1$ and $R^2$ are independently at each occurrence a $C_1$-$C_3$ aliphatic radical or a $C_3$-$C_{20}$ cycloaliphatic radical, and * represents the bonding site;
(B) about 35 weight percent to about 65 weight percent of a first difunctional cyanate ester having a structure (II), or a prepolymer thereof $$NCO—Ar^3—R^3—Ar^3—OCN, \quad (II)$$

wherein $Ar^3$ is a $C_5$-$C_{30}$ aromatic radical, $R^3$ is a bond or a $C_1$-$C_2$ aliphatic radical; and
(C) about 15 weight percent to about 40 weight percent of a second difunctional cyanate ester having a structure (III), or a prepolymer thereof $$NCO—Ar^4—R^5—Ar^4—OCN, \quad (III)$$

wherein $Ar^4$ is a $C_5$-$C_{30}$ aromatic radical, and $R^5$ is a $C_3$-$C_{10}$ aliphatic radical.

One embodiment is a method for bonding a winding or a core laminate. The method includes impregnating the winding or the core laminate with a curable composition. The curable composition includes:

(A) about 10 weight percent to about 25 weight percent of a polyfunctional cyanate ester having a structure (I)

$$NCO—Ar^1—R^1—[-Y—R^1-]_n—Ar^1—OCN, \quad (I)$$

wherein "n" is an integer equal to or greater than 1, Y has a structure (i) or (ii)

$$*R^2—Ar^2—OCN, \text{ or} \quad (i)$$

$$*Ar^2—OCN, \quad (ii)$$

$Ar^1$ and $Ar^2$ are independently at each occurrence a $C_5$-$C_{30}$ aromatic radical, $R^1$ and $R^2$ are independently at each occurrence a $C_1$-$C_3$ aliphatic radical or a $C_3$-$C_{20}$ cycloaliphatic radical, and * represents the bonding site;
(B) about 35 weight percent to about 65 weight percent of a first difunctional cyanate ester having a structure (II), or a prepolymer thereof $$NCO—Ar^3—R^3—Ar^3—OCN, \quad (II)$$

wherein $Ar^3$ is a $C_5$-$C_{30}$ aromatic radical, $R^3$ is a bond or a $C_1$-$C_2$ aliphatic radical; and
(C) about 15 weight percent to about 40 weight percent of a second difunctional cyanate ester having a structure (III), or a prepolymer thereof $$NCO—Ar^4—R^5—Ar^4—OCN, \quad (III)$$

wherein $Ar^4$ is a $C_5$-$C_{30}$ aromatic radical, and $R^5$ is a $C_3$-$C_{10}$ aliphatic radical. The method further includes applying a vacuum to the winding or the core laminate; and heating the winding or the core laminate to cure the curable composition.

One embodiment is a curable composition, including:
(A) about 10 weight percent to about 25 weight percent of a polyfunctional cyanate ester having a structure (I)

$$NCO—Ar^1—R^1—[-Y—R^1-]_n—Ar^1—OCN, \quad (I)$$

wherein "n" is an integer equal to or greater than 1, Y has a structure (i) or (ii)

$$*R^2—Ar^2—OCN, \text{ or} \quad (iii)$$

$$*Ar^2—OCN, \quad (iv)$$

$Ar^1$ and $Ar^2$ are independently at each occurrence a $C_5$-$C_{30}$ aromatic radical, $R^1$ and $R^2$ are independently at each occurrence a $C_1$-$C_3$ aliphatic radical or a $C_3$-$C_{20}$ cycloaliphatic radical, and * represents the bonding site;
(B) about 35 weight percent to about 65 weight percent of a first difunctional cyanate ester having a structure (II), or a prepolymer thereof $$NCO—Ar^3—R^3—Ar^3—OCN, \quad (II)$$

wherein $Ar^3$ is a $C_5$-$C_{30}$ aromatic radical, $R^3$ is a bond or a $C_1$-$C_2$ aliphatic radical; and
(C) about 15 weight percent to about 40 weight percent of a second difunctional cyanate ester having a structure (III), or a prepolymer thereof $$NCO—Ar^4—R^5—Ar^4—OCN, \quad (III)$$

wherein $Ar^4$ is a $C_5$-$C_{30}$ aromatic radical, and $R^5$ is a $C_3$-$C_{10}$ aliphatic radical.

DRAWINGS

These and other features, aspects, and advantages of the present invention will become better understood when the following detailed description is read with reference to the accompanying drawings, wherein.

DETAILED DESCRIPTION

As discussed in detail below, some of the embodiments of the invention relate to composition for encapsulation or bonding windings or core laminates in an electrical machine. More particularly, the invention relates to cyanate ester resin compositions for encapsulation or bonding windings or core laminates in an electrical machine.

Approximating language, as used herein throughout the specification and claims, may be applied to modify any quantitative representation that could permissibly vary without resulting in a change in the basic function to which it is related. Accordingly, a value modified by a term or terms, such as "about", and "substantially" is not to be limited to the precise value specified. In some instances, the approximating language may correspond to the precision of an instrument for measuring the value. Here and throughout the specification and claims, range limitations may be combined and/or interchanged, such ranges are identified and include all the sub-ranges contained therein unless context or language indicates otherwise.

In the following specification and the claims, the singular forms "a", "an" and "the" include plural referents unless the context clearly dictates otherwise. As used herein, the term "or" is not meant to be exclusive and refers to at least one of the referenced components being present and includes instances in which a combination of the referenced components may be present, unless the context clearly dictates otherwise.

As used herein, the term "aromatic radical" refers to an array of atoms having a valence of at least one comprising at least one aromatic group. The array of atoms having a valence of at least one comprising at least one aromatic group may include heteroatoms such as nitrogen, sulfur, selenium, silicon and oxygen, or may be composed exclusively of carbon and hydrogen. As used herein, the term "aromatic radical" includes but is not limited to phenyl, pyridyl, furanyl, thienyl, naphthyl, phenylene, and biphenyl radicals. As noted, the aromatic radical contains at least one aromatic group. The aromatic group is invariably a cyclic structure having 4n+2 "delocalized" electrons where "n" is an integer equal to 1 or greater, as illustrated by phenyl groups (n=1), thienyl groups (n=1), furanyl groups (n=1), naphthyl groups (n=2), azulenyl groups (n=2), anthraceneyl groups (n=3) and the like. The aromatic radical may also include nonaromatic components. For example, a benzyl group is an aromatic radical, which comprises a phenyl ring (the aromatic group) and a methylene group (the nonaromatic component). Similarly a tetrahydronaphthyl radical is an aromatic radical comprising an aromatic group ($C_6H_3$) fused to a nonaromatic component —$(CH_2)_4$—. For convenience, the term "aromatic radical" is defined herein to encompass a wide range of functional groups such as alkyl groups, alkenyl groups, alkynyl groups, haloalkyl groups, haloaromatic groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylphenyl radical is a $C_7$ aromatic radical comprising a methyl group, the methyl group being a functional group which is an alkyl group. Similarly, the 2-nitrophenyl group is a $C_6$ aromatic radical comprising a nitro group, the nitro group being a functional group. Aromatic radicals include halogenated aromatic radicals such as 4-trifluoromethylphenyl, hexafluoroisopropylidenebis(4-phen-1-yloxy) (i.e., —OPhC($CF_3$)$_2$PhO—), 4-chloromethylphen-1-yl, 3-trifluorovinyl-2-thienyl, 3-trichloromethylphen-1-yl (i.e., 3-CCl$_3$Ph-), 4-(3-bromoprop-1-yl)phen-1-yl (i.e., 4-BrCH$_2$CH$_2$CH$_2$Ph-), and the like. Further examples of aromatic radicals include 4-allyloxyphen-1-oxy, 4-aminophen-1-yl (i.e., 4-H$_2$NPh-), 3-aminocarbonylphen-1-yl (i.e., NH$_2$COPh-), 4-benzoylphen-1-yl, dicyanomethylidenebis(4-phen-1-yloxy) (i.e., —OPhC(CN)$_2$PhO—), 3-methylphen-1-yl, methylenebis(4-phen-1-yloxy) (i.e., —OPhCH$_2$PhO—), 2-ethylphen-1-yl, phenylethenyl, 3-formyl-2-thienyl, 2-hexyl-5-furanyl, hexamethylene-1,6-bis(4-phen-1-yloxy) (i.e., —OPh(CH$_2$)$_6$PhO—), 4-hydroxymethylphen-1-yl (i.e., 4-HOCH$_2$Ph-), 4-mercaptomethylphen-1-yl (i.e., 4-HSCH$_2$Ph-), 4-methylthiophen-1-yl (i.e., 4-CH$_3$SPh-), 3-methoxyphen-1-yl, 2-methoxycarbonylphen-1-yloxy (e.g., methyl salicyl), 2-nitromethylphen-1-yl (i.e., 2-NO$_2$CH$_2$Ph), 3-trimethylsilylphen-1-yl, 4-t-butyldimethylsilylphenl-1-yl, 4-vinylphen-1-yl, vinylidenebis(phenyl), and the like. The term "a $C_3$-$C_{10}$ aromatic radical" includes aromatic radicals containing at least three but no more than 10 carbon atoms. The aromatic radical 1-imidazolyl ($C_3H_2N_2$—) represents a $C_3$ aromatic radical. The benzyl radical ($C_7H_7$—) represents a $C_7$ aromatic radical.

As used herein the term "cycloaliphatic radical" refers to a radical having a valence of at least one, and comprising an array of atoms which is cyclic but which is not aromatic. As defined herein a "cycloaliphatic radical" does not contain an aromatic group. A "cycloaliphatic radical" may comprise one or more noncyclic components. For example, a cyclohexylmethyl group ($C_6H_{11}CH_2$—) is a cycloaliphatic radical which comprises a cyclohexyl ring (the array of atoms which is cyclic but which is not aromatic) and a methylene group (the noncyclic component). The cycloaliphatic radical may include heteroatoms such as nitrogen, sulfur, selenium, silicon and oxygen, or may be composed exclusively of carbon and hydrogen. For convenience, the term "cycloaliphatic radical" is defined herein to encompass a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylcyclopent-1-yl radical is a $C_6$ cycloaliphatic radical comprising a methyl group, the methyl group being a functional group which is an alkyl group. Similarly, the 2-nitrocyclobut-1-yl radical is a $C_4$ cycloaliphatic radical comprising a nitro group, the nitro group being a functional group. A cycloaliphatic radical may comprise one or more halogen atoms, which may be the same or different. Halogen atoms include, for example; fluorine, chlorine, bromine, and iodine. Cycloaliphatic radicals comprising one or more halogen atoms include 2-trifluoromethylcyclohex-1-yl, 4-bromodifluoromethylcyclooct-1-yl, 2-chlorodifluoromethylcyclohex-1-yl, hexafluoroisopropylidene-2,2-bis (cyclohex-4-yl) (i.e., —$C_6H_{10}C(CF_3)_2C_6H_{10}$—), 2-chloromethylcyclohex-1-yl, 3-difluoromethylenecyclohex-1-yl, 4-trichloromethylcyclohex-1-yloxy, 4-bromodichloromethylcyclohex-1-ylthio, 2-bromoethylcyclopent-1-yl, 2-bromopropylcyclohex-1-yloxy (e.g., CH$_3$CHBrCH$_2$C$_6$H$_{10}$O—), and the like. Further examples of cycloaliphatic radicals include 4-allyloxycyclohex-1-yl, 4-aminocyclohex-1-yl (i.e., H$_2$NC$_6$H$_{10}$—), 4-aminocarbonylcyclopent-1-yl (i.e., NH$_2$COC$_5$H$_8$—), 4-acetyloxycyclohex-1-yl, 2,2-dicyanoisopropylidenebis(cyclohex-4-yloxy)

(i.e., —OC$_6$H$_{10}$C(CN)$_2$C$_6$H$_{10}$O—), 3-methylcyclohex-1-yl, methylenebis(cyclohex-4-yloxy) (i.e., —OC$_6$H$_{10}$CH$_2$C$_6$H$_{10}$O—), 1-ethylcyclobut-1-yl, cyclopropylethenyl, 3-formyl-2-terahydrofuranyl, 2-hexyl-5-tetrahydrofuranyl, hexamethylene-1,6-bis(cyclohex-4-yloxy) (i.e., —OC$_6$H$_{10}$(CH$_2$)$_6$C$_6$H$_{10}$O—), 4-hydroxymethylcyclohex-1-yl (i.e., 4-HOCH$_2$C$_6$H$_{10}$—), 4-mercaptomethylcyclohex-1-yl (i.e., 4-HSCH$_2$C$_6$H$_{10}$—), 4-methylthiocyclohex-1-yl (i.e., 4-CH$_3$SC$_6$H$_{10}$—), 4-methoxycyclohex-1-yl, 2-methoxycarbonylcyclohex-1-yloxy (2-CH$_3$OCOC$_6$H$_{10}$O—), 4-nitromethylcyclohex-1-yl (i.e., NO$_2$CH$_2$C$_6$H$_{10}$—), 3-trimethylsilylcyclohex-1-yl, 2-t-butyldimethylsilylcyclopent-1-yl, 4-trimethoxysilylethylcyclohex-1-yl (e.g., (CH$_3$O)$_3$SiCH$_2$CH$_2$C$_6$H$_{10}$—), 4-vinylcyclohexen-1-yl, vinylidenebis(cyclohexyl), and the like. The term "a C$_3$-C$_{10}$ cycloaliphatic radical" includes cycloaliphatic radicals containing at least three but no more than 10 carbon atoms. The cycloaliphatic radical 2-tetrahydrofuranyl (C$_4$H$_7$O—) represents a C$_4$ cycloaliphatic radical. The cyclohexylmethyl radical (C$_6$H$_{11}$CH$_2$—) represents a C$_7$ cycloaliphatic radical.

As used herein the term "aliphatic radical" refers to an organic radical having a valence of at least one consisting of a linear or branched array of atoms which is not cyclic. Aliphatic radicals are defined to comprise at least one carbon atom. The array of atoms comprising the aliphatic radical may include heteroatoms such as nitrogen, sulfur, silicon, selenium and oxygen or may be composed exclusively of carbon and hydrogen. For convenience, the term "aliphatic radical" is defined herein to encompass, as part of the "linear or branched array of atoms which is not cyclic" a wide range of functional groups such as alkyl groups, alkenyl groups, alkynyl groups, haloalkyl groups, conjugated dienyl groups, alcohol groups, ether groups, aldehyde groups, ketone groups, carboxylic acid groups, acyl groups (for example carboxylic acid derivatives such as esters and amides), amine groups, nitro groups, and the like. For example, the 4-methylpent-1-yl radical is a C$_6$ aliphatic radical comprising a methyl group, the methyl group being a functional group which is an alkyl group. Similarly, the 4-nitrobut-1-yl group is a C$_4$ aliphatic radical comprising a nitro group, the nitro group being a functional group. An aliphatic radical may be a haloalkyl group which comprises one or more halogen atoms which may be the same or different. Halogen atoms include, for example; fluorine, chlorine, bromine, and iodine. Aliphatic radicals comprising one or more halogen atoms include the alkyl halides trifluoromethyl, bromodifluoromethyl, chlorodifluoromethyl, hexafluoroisopropylidene, chloromethyl, difluorovinylidene, trichloromethyl, bromodichloromethyl, bromoethyl, 2-bromotrimethylene (e.g., —CH$_2$CHBrCH$_2$—), and the like. Further examples of aliphatic radicals include allyl, aminocarbonyl (i.e., —CONH$_2$), carbonyl, 2,2-dicyanoisopropylidene (i.e., —CH$_2$C(CN)$_2$CH$_2$—), methyl (i.e., —CH$_3$), methylene (i.e., —CH$_2$—), ethyl, ethylene, formyl (i.e., —CHO), hexyl, hexamethylene, hydroxymethyl (i.e., —CH$_2$OH), mercaptomethyl (i.e., —CH$_2$SH), methylthio (i.e., —SCH$_3$), methylthiomethyl (i.e., —CH$_2$SCH$_3$), methoxy, methoxycarbonyl (i.e., CH$_3$OCO—), nitromethyl (i.e., —CH$_2$NO$_2$), thiocarbonyl, trimethylsilyl (i.e., (CH$_3$)$_3$Si—), t-butyldimethylsilyl, 3-trimethyoxysilylpropyl (i.e., (CH$_3$O)$_3$SiCH$_2$CH$_2$CH$_2$—), vinyl, vinylidene, and the like. By way of further example, a C$_1$-C$_{10}$ aliphatic radical contains at least one but no more than 10 carbon atoms. A methyl group (i.e., CH$_3$—) is an example of a C$_1$ aliphatic radical. A decyl group (i.e., CH$_3$(CH$_2$)$_9$—) is an example of a C$_{10}$ aliphatic radical.

As discussed in detail below, some embodiments of the invention are directed to a curable composition for bonding windings or core laminates in an electrical machine. The curable composition includes: (A) about 10 weight percent to about 25 weight percent of a polyfunctional cyanate ester having a structure (I)

wherein "n" is an integer equal to or greater than 1, Y has a structure (i) or (ii)

Ar$^1$ and Ar$^2$ are independently at each occurrence a C$_5$-C$_{30}$ aromatic radical, R$^1$ and R$^2$ are independently at each occurrence a C$_1$-C$_3$ aliphatic radical or a C$_3$-C$_{20}$ cycloaliphatic radical, and * represents the bonding site;

(B) about 35 weight percent to about 65 weight percent of a first difunctional cyanate ester having a structure (II), or a prepolymer thereof;

wherein Ar$^3$ is a C$_5$-C$_{30}$ aromatic radical, R$^3$ is a bond or a C$_1$-C$_2$ aliphatic radical; and

(C) about 15 weight percent to about 40 weight percent of a second difunctional cyanate ester having a structure (III), or a prepolymer thereof wherein Ar$^4$ is a C$_5$-C$_{30}$ aromatic radical, and R$^5$ is a C$_3$-C$_{10}$ aliphatic radical.

The term "polyfunctional cyanate ester" as used herein refers to a material including three or more cyanate ester functional groups. The term "difunctional cyanate ester" as used herein refers to a material including two cyanate ester functional groups.

Non-limiting examples of suitable polyfunctional cyanate esters include phenolic novolac cyanate ester, dicylopentadiene novolac cyanate ester, 1,2,3-tris(4-cyanatophenyl)-propane, or combinations thereof. In certain embodiments, the polyfunctional cyanate ester includes a structure having formulae (VII) or (VIII):

Non-limiting examples of a suitable polyfunctional cyanate ester include Primaset™ PT30, Primaset™ PT15, or combinations thereof, commercially available from Lonza.

In some embodiments, the first difunctional cyanate ester includes a structure having a formula (IV):

(IV)

wherein $Ar^3$ is a $C_5$-$C_{30}$ aromatic radical. In certain embodiments, the first difunctional ester includes a structure having a formula (IX):

(IX)

Non-limiting example of a suitable first difunctional cyante ester includes Primaset™ LECY, commercially available from Lonza.

In some embodiments, the second difunctional cyanate ester includes a prepolymer of a difunctional cyanate ester having a formula (V):

(V)

wherein $Ar^4$ is a $C_5$-$C_{30}$ aromatic radical, and $R^4$ is $C_3$-$C_{20}$ aliphatic radical. The term "prepolymer" as used herein refers to a monomer or a plurality of monomers that have been reacted to an intermediate molecular weight state. This material is capable of further polymerization by reactive groups to a high molecular weight state. As such, mixtures of reactive polymers with un-reacted monomers may also be referred to as pre-polymers. The term "prepolymer" and "polymer precursor" are sometimes used interchangeably.

In some embodiments, the second difunctional cyanate ester includes a prepolymer of a difunctional cyanate ester having a formula (VI):

(VI)

wherein $Ar^4$ is a $C_5$-$C_{30}$ aromatic radical.

In some embodiments, the second difunctional cyanate ester includes a prepolymer of a difunctional cyanate ester having a formula (X):

(X)

Non-limiting example of a suitable second difunctional cyanate ester includes Primaset™ BA3000, commercially available from Lonza. The curable composition may further include a suitable catalyst. Without being bound by any theory it is believed that in the absence of a sufficient amount of catalyst, the curable composition may react quickly on heating, and the corresponding reaction rate may be higher than the heat dissipation rate resulting in local hot spots and thermal runaway. In some embodiments, the reaction temperature may be reduced and the reaction rate may be controlled by choosing the appropriate catalyst chemistry and by controlling the amount of catalyst used.

Non-limiting examples of suitable catalysts include transition metal carboxylates or chelates. In some embodiments, non-limiting examples of suitable catalyst include napthenates of zinc, copper, cobalt, manganese, iron, aluminum, or combinations of thereof. In some embodiments, non-limiting examples of suitable catalyst include acetylacetonates of zinc, copper, cobalt, manganese, iron, aluminum, or combinations of thereof. In some embodiments, co-catalysts that provide an active hydrogen source (for example, alkylphenols) may also be used. In some embodiments, the catalyst may be present in the composition in a range from about 10 parts per million (ppm) to about 500 ppm.

In some embodiments, the curable composition may further include additional additives, such as, stabilizing agents, additional toughening agents and the like.

In some embodiments, the curable composition may be substantially free of epoxy, maleimide, or combinations thereof. The term "substantially free" as used in this context means that the amount of epoxy, maleimide, or isocyanate monomers in the composition is less than about 1 weight percent. In some embodiments, the composition for binding windings is completely free of epoxy, maleimide, or isocyanate monomers. The compositions in accordance with some embodiments of the invention may provide the desired properties in the cured composition without using conventional curable materials, such as, for example, epoxy, maleimide, or isocyanate monomers. Use of epoxies in the curable composition may, for example, result in poorer thermal performance.

In some embodiments, the composition is substantially free of a solvent. The term "substantially free" as used in this context means that the amount of solvent in the composition is less than about 1 weight percent. In some embodiments, the composition for binding windings is completely free of a solvent. Without being bound by any theory it is believed that the composition for bonding of windings is substantially solvent-free to avoid voids formation by volatiles. However, the curable composition in accordance with embodiments of the invention may have a viscosity low enough for easy impregnation into a tight winding space, thereby resulting in the desired dielectric performance and thermal conduction.

In some embodiments, the composition further comprises a solvent. Without being bound by any theory, it is believed that the solvent may dilute the composition to a sufficiently low viscosity such that the composition forms a thin layer (thickness less than 0.005 inches) of bonding material between the laminates, for example. A thin layer of bonding material may be desirable to maintain the flux density in the electrical machine.

Non-limiting examples of suitable solvents include, for example, ketones, such as acetone, methyl ethyl ketone, and the like; ethers, such as, tetrahydrofuran, dioxolane, dioxane, and the like; amides, such as, dimethylacetamide, 1-methyl-2-pyrrolidinone, and the like; and aromatic solvents, such as, toluene, vinyl toluene and the like. In some embodiments, the amount of solvent in the composition is in a range from about 10 weight percent to 40 about weight percent.

The curable composition may be cured using any suitable method. In some embodiments, the curable composition may be cured by heating the composition. In some embodiments, a temperature in a range from about 18° C. to about 400° C. may be used for curing. In certain embodiments, a temperature in a range from about 100° C. to about 300° C. may be used for curing. The time required for curing may differ depending on the end application, for example, it may depend upon the thickness of the molded article or laminate. In some embodiments, a time period sufficient for curing the composition may be in a range of from about 1 hour to about 2 hours. In embodiments wherein the cured composition is used as molded articles (such as those produced via resin transfer molding, compression molding, or injection molding), laminates, or bonded articles, it may be desirable to apply pressure during the heat curing step. In some other embodiments, microwave, radio frequency, ionizing radiation, electron beams, or combinations thereof may be used to effect the curing step.

Without being bound by any theory, it is believed that the polyfunctional cyanate ester after cross-linking provides the desired thermal stability and thermal properties (e.g., glass transition temperature greater than 300° C.). Further, the first difunctional cyanate ester when blended with the polyfunctional cyanate ester provides the desired viscosity for processing. However, the cured composition formed after cross-linking of the polyfunctional cyanate ester and the first difunctional cyanate ester is typically rigid, and may be susceptible to crack formations during thermal cycling. Therefore, according to embodiments of the present invention, toughening materials, such as, the second difunctional cyanate ester are added to improve the crack resistance of the cured composition, while maintaining the viscosity of the curable composition and desired thermal stability.

As noted earlier, in some embodiments, the amount of polyfunctional cyanate ester in the curable composition is in a range from about 10 weight percent to about 25 weight percent. The amount of the first difunctional cyanate ester in the curable composition is in a range from about 35 weight percent to about 65 weight percent. Further, the amount of second difunctional cyanate ester in the curable composition is in a range from about 15 weight percent to about 40 weight percent.

In certain embodiments, the amount of polyfunctional cyanate ester in the curable composition is in a range from about 10 weight percent to about 25 weight percent. The amount of the first difunctional cyanate ester in the curable composition is in a range from about 55 weight percent to about 65 weight percent. Further, the amount of second difunctional cyanate ester in the curable composition is in a range from about 15 weight percent to about 30 weight percent.

Without being bound by any theory it is believed that by controlling the relative amounts of polyfunctional cyanate ester, the first difunctional cyanate ester, and the second difunctional cyanate ester, the desired combination of properties (such as, thermal stability, crack resistance and viscosity) may be achieved. For example, as described in detail later, a certain minimum amount of the polyfunctional cyanate ester is desired to achieve the desired thermal stability (for example, measured as one or more of isothermal aging stability, puffiness, or mechanical strength).

Similarly, the amount of the first difunctional cyanate ester may be controlled in the curable composition such that the curable composition has viscosity sufficiently low for processing. In some embodiments, the curable composition may be substantially solvent-free and the first difunctional cyanate ester may provide the desired viscosity characteristics. Further, the amount of the second difunctional cyanate ester may be controlled in the curable composition to provide the desired crack resistance in the cured composition.

In some embodiments, the curable composition has a viscosity, and the related cured composition has a thermal cycle crack resistance and thermal dimensional stability suitable for the end-use application (for example, bonding resin for windings or laminates). The term "cured composition" as used herein includes both partially and completely cured compositions.

In some embodiments, the cured composition has a thermal dimensional stability sufficient to exhibit less than less than 60 percent mean density change after heating at about 280° C. for a time period greater than about 500 hours. In some embodiments, the cured composition has a thermal stability sufficient to exhibit less than less than 50 percent mean density change after heating at about 280° C. for a time period greater than about 500 hours.

Thermal stability of the cured composition may be further characterized by the change in its dimension (sometimes referred to as "cracking") during thermal cycling. Such cycling may be used to emulate the thermal excursions the cured composition may be required to endure during normal operation of an electrical machine. The thermal excursion, in combination with operational mechanical stresses, can cause the cured composition to crack and fail. Thus, it may be desirable that the composition exhibit minimal dimensional change and be resistant to cracking during thermal cycling.

Further, to facilitate improvement in thermal stability, it is desirable that the cured composition has a glass transition temperature greater than about 250° C. 100, in some embodiments. In some embodiments, the cured composition has a glass transition temperature greater than about 300° C.

In some embodiments, the curable composition has a viscosity less than about 3000 centiPoise (cP) at a temperature of about 50° C. In some embodiments, the curable composition has a viscosity less than about 1000 centiPoise (cP) at a temperature of about 70° C. In some embodiments, the curable composition has a viscosity less than about 500 centiPoise (cP) at a temperature of about 70° C.

The cured composition after thermal cycling may also have a resistance sufficient to pass the nut crack test. In some embodiments, the curable composition after curing has a crack resistance such that the average number of cracks (from a representative number of samples) having a dimension greater than 2 mm in length is equal to or less than 1. In some embodiments, the curable composition after curing has a crack resistance such that the average number of cracks having a dimension greater than 2 mm in length is equal to 0.

An impregnating resin including a cured composition of the curable composition is also presented. Non-limiting examples of suitable applications for the curable composition or the impregnating resin include encapsulation, bonding, insulation, lamination, or combinations thereof of articles. In some embodiments, the curable composition or the impregnating resin may be used for encapsulating or bonding articles/devices in an electrical machine. Non-limiting examples of suitable articles/devices include windings, core-laminates, slot liners slot wedges, or combinations thereof.

In certain embodiments, the impregnating resin may be used for bonding windings, core laminates, or both in an electrical machine. The impregnating resin may function as a varnish in some embodiments. In some embodiments, the curable composition and the corresponding impregnating resin may be used for filling the gaps in the windings of an electrical machine.

In some embodiments, a winding is presented. The term "winding" as used herein refers to a single winding, a plurality of windings, or a winding coil. The winding is bonded with a bonding material, and the bonding material includes a cured composition of the curable composition described herein. In some embodiments, the winding may include a copper wire. The winding may further include any suitable insulating material to provide primary insulation and the bonding material may provide secondary insulation, in some such instances.

Figure 1:
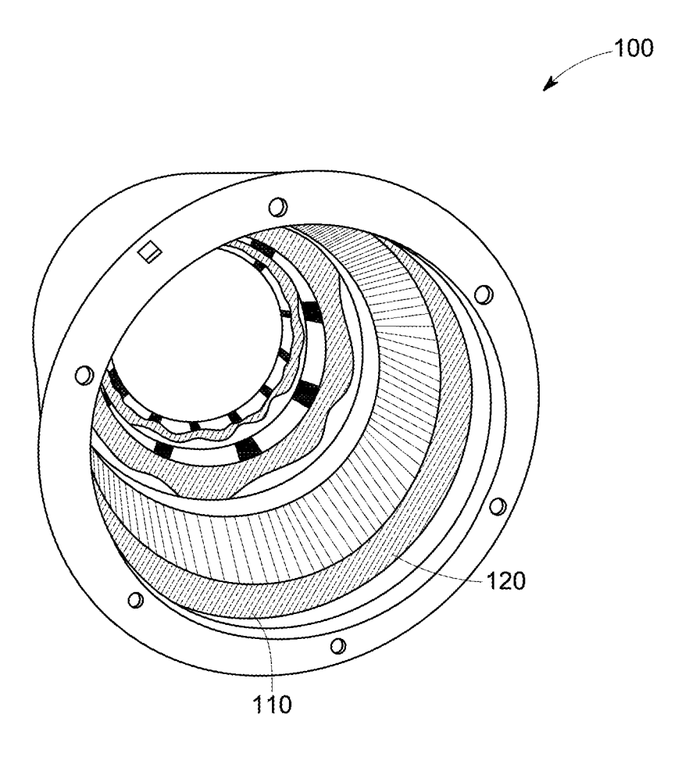
FIG. 1 shows a stator including impregnated windings, in accordance with some embodiments of the invention.

In some embodiments, the winding may be formed by impregnating the winding with the curable composition followed by curing the curable composition to form a cured composition such that the windings are substantially bonded with each other. Non-limiting examples of suitable windings include stator windings, rotor windings, or combinations thereof. In certain embodiments, the windings include stator windings. FIG. 1 illustrates a schematic of a stator 100 including windings 110 impregnated with the curable composition 120.

In some embodiments, a core laminate is presented. The core laminate is bonded with a bonding material, and the bonding material includes a cured composition of the composition described herein. In some embodiments, the core laminate may include iron, aluminum, or combinations thereof. The core laminate may further include a suitable insulating material.

In some embodiments, as described in detail later, the core laminate may be formed by impregnating the core laminate with the curable composition followed by curing the composition to form a cured composition such that the core laminates are substantially bonded with each other. Non-limiting examples of suitable core laminates include stator core laminates, rotor core laminates, or combinations thereof. In certain embodiments, the core laminates include stator core laminates.

In some embodiments, a varnish suitable for bonding copper windings is presented. The varnish in such instances provides: (1) desired heat stability at a temperature greater than 250° C. by using the polyfunctional cyanate ester; (2) desired crack resistance under thermal cycling conditions (e.g., thermal cycling from 260° C. to −40° C.) by using the second difunctional cyanate ester as toughener; and (3) processability for vacuum impregnation process by using the first difunctional cyanate ester to maintain viscosity, and appropriate catalyst selection to minimize exothermic heat resulting in thermal run ways.

Further, the varnish when used for bonding windings is substantially free of a solvent such that void formation is minimized, while providing sufficiently low viscosity for easy penetration into a tight winding space, thereby resulting in improved dielectric performance and thermal conduction. The varnish is also suitable for bonding steel laminates as magnetic core in motors, generators and transformers. In such instances, the varnish when used for bonding laminates provides the desired bonding strength under high speed vibration.

Some embodiments are related to an electrical machine. In some embodiments, the electrical machine includes the winding, wherein the binding includes a bonding material comprised of the cured composition as described herein. In some embodiments, the electrical machine includes the core laminate, wherein the core laminate includes a bonding material comprised of the cured composition as described herein. Non-limiting examples of suitable electrical machines include a motor, a generator, a transformer, a toroid, an inductor, and combinations thereof.

A method for bonding a winding or a core laminate is also presented. The method includes impregnating the winding or the core laminate with a curable composition, as described earlier. The method further includes applying a vacuum to the winding or the core laminate; and heating the winding or the core laminate to cure the curable composition. As noted earlier, in some embodiments, the curable composition is for bonding windings, and in such instances the curable composition may be substantially free of a solvent. In embodiments wherein the curable composition is for bonding core laminates, the curable composition may further include a solvent.

The curable composition can be applied and cured according to any suitable technique. One example of such a method is the vacuum pressure impregnation method, in which an entire winding assembly is placed in a pressure vessel under a high vacuum that draws out entrapped air and other gases. The curable composition is introduced to the pressure vessel and the entire tank is pressurized, typically to at least 90 psi or higher to achieve a total penetration of the winding. The assembly may be baked at elevated temperatures to cure the curable composition. Other suitable coating and curing techniques include dip coat and trickle treat, may also be used in some embodiments. Without being bound by any theory, it is believed that vapor process impregnation (VPI) process may allow for thin film coating of the curable composition, which may be cost-effective and provide improved heat transfer.

EXAMPLES

Example 1 Blends of PT30, LECY, and BA3000

The blends were prepared by centrifugal mixing of the PT30, LECY and BA3000 resins in ~200 g batches. PT30 and BA3000 resins were preheated to 50° C. to facilitate mixing. A catalyst solution (e.g., copper acetoacetonate in nonylphenol) was added and mixed using the same mixer. In some cases, the final resin was preheated to 50° C. to facilitate dispersion of the catalyst solution. The compositions of the resins were varied in the blends. Table 1 lists the compositions for samples 1-3.

Comparative Example 1 Blends of PT30, LECY, and BA3000

The blends were prepared using the method similar to Example 1, except the compositions were varied. Table 1 lists the compositions for comparative samples 1-3.

Example 2 Viscosity Measurements

For viscosity measurements, 20 g samples were measured in a concentric cylinder rheometer geometry at 50° C. and 70° C., at rates from 0.1 rpm to 200 rpm, equivalent to a shear rate range of 0.03-70 $s^{-1}$.

Example 3 Crack Resistance Test

The crack resistance test is performed by carefully curing the resin of interest under a specified cure profile in an open mold comprising a pan and a hexagonal steel nut disposed at the center of the pan. A sample is made by pouring samples of ~6 g of the catalyzed mixture was poured into the 1" diameter metal pans. In order to dispense the mixtures, some of the resins were heated briefly to 50 C. The samples were then cured in a nitrogen-purged oven equipped with a fan to circulate air. The curing profile was:

(I) 1.50 minute ramp to 120° C. and 2 hour hold at 120° C.;

(II) 2.22 minute ramp to 165° C. and 2 hour hold at 165 C;

(III) 3.27 minute ramp to 220° C. and 2 hour hold at 220° C.;

(IV) 4.20 minute ramp to 260° C. and 2 hour hold at 260° C.; and (V) Cool slowly to room temperature in the oven (no active cooling).

All of the ramps in the curing profile were performed at 2° C./min.

If the sample survives these cycles without exhibiting a crack greater than 2 mm, it generally indicates that the composition has sufficient ductility and resistance to thermal cycling for varnish applications. Compositions that crack during the cycles fail the test and are generally not suitable for varnish applications.

Example 4 Isothermal Aging Stability Test

For thermal aging, ~11 g of each mixture tested was poured into 2" aluminum metal pans; some mixtures required heating briefly to 50° C. to dispense. The mixtures were then cured according to the same curing profile described above for nut crack test, except that the steps (I)-(III) were performed without nitrogen purge, and the step (IV) was performed without nitrogen purge or air circulation. The isothermal aging was conducted at 280° C. in air (no nitrogen purge) in an oven without air circulation.

Tables 1 and 2 show the results for Samples 1-3 and Comparative Samples 1-3. As shown in Table 1, the data seems to suggest a correlation between increasing PT-30 content and increasing thermal dimensional stability and crack resistance. For example 1, Comparative Sample 1 (weight fraction of PT30=0%) exhibited lower thermal dimensional stability as compared to Samples 1-3 (weight fraction of PT30=12-24%) as shown in Table 1. However, the samples with greater amount of PT30, for example, Comparative Sample 2 (weight fraction of PT30=70%) failed the nut crack result. Therefore, the results show that it may be desirable that the weight fraction of PT30 is in a range from about 10% to about 20% to obtain the desired combination of properties.

Similarly, while Comparative Sample 3 (weight fraction of PT 30=23% and BA3000=62%) exhibited similar or slightly better thermal dimensional stability when compared to Samples 1-2 (weight fraction of PT 30=23-24% and BA3000=15-38%), the sample showed very high viscosity values. Therefore, the results show that it may be desirable that the weight fraction of BA3000 is in a range from about 15% to about 40% to obtain the desired combination of properties.

Further, while Comparative Sample 3 (weight fraction of PT 30=23% and LECY=15%) exhibited similar or slightly better thermal dimensional stability when compared to Samples 1-2 (weight fraction of PT 30=23-24% and LECY=38-62%), the sample failed the nut crack test. Therefore, the results show that it may be desirable that the weight fraction of LECY is in a range from about 35% to about 65% to obtain the desired combination of properties.

TABLE 1

Thermal dimensional stability and toughness results

| | Composition | | | Thermal dimensional stability (% mean density change after heating at 280° C. for at least 500 hours) | Crack Resistance (Average no. of cracks exceeding 2 mm in length) |
|---|---|---|---|---|---|
| Sample | PT30 (wt %) | LECY (wt %) | BA3000 (wt %) | | |
| Sample 1 | 23 | 62 | 15 | −36% | 1 |
| Sample 2 | 24 | 38 | 38 | −37% | 0.5 |
| Sample 3 | 12 | 62 | 26 | −58% | 0 |
| Comparative Sample 1 | 0 | 50 | 50 | −69% | 0 |
| Comparative Sample 2 | 70 | 15 | 15 | −11% | 4.5 |
| Comparative Sample 3 | 23 | 15 | 62 | −21% | 4 |

TABLE 2

Viscosity results

| | Composition | | | | |
|---|---|---|---|---|---|
| Sample | PT30 (wt %) | LECY (wt %) | BA3000 (wt %) | Viscosity at 50° C. (cP) | Viscosity at 70° C. (cP) |
| Sample 1 | 23 | 62 | 15 | 157 | 53 |
| Sample 2 | 24 | 38 | 38 | 1495 | 324 |
| Sample 3 | 12 | 62 | 26 | 232 | 71 |
| Comparative Sample 1 | 0 | 50 | 50 | 690 | 178 |
| Comparative Sample 2 | 70 | 15 | 15 | 14300 | 778 |
| Comparative Sample 3 | 23 | 15 | 62 | 40400 | 3660 |

Example 5 Vacuum Pressure Impregnation of Varnish into Stator Windings

Stator Preparation

Stators were cleaned with an appropriate solvent, such as isopropanol, to remove grease and oil, and were dried under vacuum (25 in Hg) at 200° C. for at least one hour. A mold release agent was applied to the parts of the stator which were not to be coated with varnish, and the stator was heated to 220° C. for 1 hour to remove any volatiles.

Vacuum Pressure Impregnation

The stator was immersed in the resin in a vessel of appropriate size. The stator and varnish were then warmed in an oven at 70° C. for 30-60 minutes, until the resin temperature reached at least 50° C. Both the stator and the varnish were placed in a vacuum desiccator, which was pumped down to 25 in Hg. Vacuum was released, then reapplied to the same level and released again. The stator in varnish was placed in an oven at 70° C. for 1 to 2 hours, until the varnish temperature reached at least 65° C. The stator and varnish were then placed in a vacuum vessel and pumped down to 20 Torr, then brought slowly back to atmospheric pressure over a 60 second interval. Vacuum was applied a second time, to 20 Torr, and released over a 60 second interval. Vacuum is applied a third time, to 5.5 Torr, and released over a 60 second interval. Pressure was then applied using nitrogen to a pressure of 110 psi for 1 hour. The pressure was released over a period of 20 minutes and the stator was removed from varnish immersion Curing After the excess varnish was allowed to drip off, the varnish-impregnated stator was placed on a rotating shaft in an oven preheated to 70° C. The assembly was heated to 220° C. over a period of 2 hours and held at 220° C. for 2 hours. The oven was then turned off and allowed to cool slowly to room temperature. The impregnated stator was then heated at 2° C./min in air to 250-260° C., held at this elevated temperature for two hours, and allowed to cool slowly to room temperature.

Example 6 Stator Core Laminate Bonding Using Varnish

The metal laminate discs of the stator core were cleaned with an appropriate solvent such as isopropanol to remove oils and greases. The discs were aligned to form the required dimensions and then immersed in the varnish at 50° C. After excess varnish was squeezed out of the laminated stack, the varnish-impregnated stator core was heated in air to 220° C. over a period of 2 hours and held at 220° C. for 2 hours, heated to 250-260° C., held at this elevated temperature for 2 hours, and then allowed to cool slowly to room temperature.

The appended claims are intended to claim the invention as broadly as it has been conceived and the examples herein presented are illustrative of selected embodiments from a manifold of all possible embodiments. Accordingly, it is the Applicants' intention that the appended claims are not to be limited by the choice of examples utilized to illustrate features of the present invention. As used in the claims, the word "comprises" and its grammatical variants logically also subtend and include phrases of varying and differing extent such as for example, but not limited thereto, "consisting essentially of" and "consisting of." Where necessary, ranges have been supplied; those ranges are inclusive of all sub-ranges there between. It is to be expected that variations in these ranges will suggest themselves to a practitioner having ordinary skill in the art and where not already dedicated to the public, those variations should where possible be construed to be covered by the appended claims. It is also anticipated that advances in science and technology will make equivalents and substitutions possible that are not now contemplated by reason of the imprecision of language and these variations should also be construed where possible to be covered by the appended claims.

The invention claimed is:

1. A method for bonding a winding or a core laminate of an electrical machine, comprising:
impregnating the winding or the core laminate with a curable composition, comprising:
(A) about 10 weight percent to about 25 weight percent of a polyfunctional cyanate ester having a structure (I)

$$\text{NCO—Ar}^1\text{R}^1\text{—}[\text{—Y—R}^1\text{—}]_n\text{Ar}^1\text{—OCN},\quad\text{(I)}$$

wherein "n" is an integer equal to or greater than 1, Y has a structure (i) or (ii)

$$*\text{R}^2\text{—Ar}^2\text{—OCN, or}\quad\text{(i)}$$

$$*\text{Ar}^2\text{—OCN},\quad\text{(ii)}$$

$Ar^1$ and $Ar^2$ are independently at each occurrence a $C_5$-$C_{30}$ aromatic radical, $R^1$ and $R^2$ are independently at each occurrence a $C_1$-$C_3$ aliphatic radical or a $C_3$-$C_{20}$ cycloaliphatic radical, and * represents the bonding site;

(B) about 35 weight percent to about 65 weight percent of a first difunctional cyanate ester having a structure (II), or a prepolymer thereof $$\text{NCO—Ar}^3\text{—R}^3\text{—Ar}^3\text{—OCN},\quad\text{(II)}$$

wherein $Ar^3$ is a $C_5$-$C_{30}$ aromatic radical, $R^3$ is a bond or a $C_1$-$C_2$ aliphatic radical; and (C) about 15 weight percent to about 40 weight percent of a second difunctional cyanate ester having a structure (III), or a prepolymer thereof $$\text{NCO—Ar}^4\text{—R}^5\text{—Ar}^4\text{—OCN},\quad\text{(III)}$$

wherein $Ar^4$ is a $C_5$-$C_{30}$ aromatic radical, and $R^5$ is a $C_3$-$C_{10}$ aliphatic radical;

applying a vacuum to the winding or the core laminate; and heating the winding or the core laminate of the electrical machine to cure the curable composition and form a bonding material comprising the cured composition, wherein the electrical machine is selected from the group consisting of a motor, a generator, a transformer, a toxoid; an inductor, and combinations thereof.

2. The method of claim 1, wherein the curable composition is substantially free of a solvent.

3. The method of claim 1, wherein the curable composition further comprises a solvent.

4. The method of claim 1, wherein a cured composition of the curable composition shows thermal dimensional stability such that the cured composition has less than 60 percent mean density change after heating at 280° C. for a time period greater than about 500 hours.

5. The method of claim 1, wherein the polyfunctional cyanate ester comprises phenolic novolac cyanate ester, dicyclopentadiene novolac cyanate ester, 1,2,3-tris(4-cyanatophenyl)-propane, or combinations thereof.

6. The method of claim 1, wherein the first difunctional cyanate ester comprises a structure having a formula (IV):

$$\text{NCO—Ar}^3\text{—}\underset{\underset{\text{CH}_3}{|}}{\text{CH}}\text{—Ar}^3\text{—OCN},\quad\text{(IV)}$$

wherein $Ar^3$ is a $C_5$-$C_{30}$ aromatic radical.

7. The method of claim 1, wherein the second difunctional cyanate ester comprises a prepolymer of a difunctional cyanate ester having a formula (V):

$$NCO-Ar^4-R^4-Ar^4-OCN, \qquad (V)$$

wherein $Ar^4$ is a $C_5$-$C_{30}$ aromatic radical, and $R^4$ is $C_3$-$C_{20}$ aliphatic radical.

8. The method of claim 1, wherein the second difunctional cyanate ester comprises a prepolymer of a difunctional cyanate ester having a formula (VI):

(VI)

wherein $Ar^4$ is a $C_5$-$C_{30}$ aromatic radical.

9. The method of claim 1, wherein the curable varnish composition has a viscosity less than about 1000 centiPoise at 70° C.

10. The method of claim 1, wherein a cured varnish composition of the curable composition has a crack resistance such that the average number of cracks having a dimension greater than 2 mm in length is equal to or less than one.

* * * * *